Jan. 25, 1927.

J. CAIRNS 1,615,567

DRIVING AND REVOLVING MEANS FOR FANS AND THE LIKE

Filed May 9, 1925

WITNESSES.

INVENTOR.

John Cairns

Patented Jan. 25, 1927.

1,615,567

UNITED STATES PATENT OFFICE.

JOHN CAIRNS, OF LONDON, ENGLAND.

DRIVING AND REVOLVING MEANS FOR FANS AND THE LIKE.

Application filed May 9, 1925, Serial No. 29,244, and in Great Britain July 31, 1924.

This invention relates to self-controlled fans in which the motive power for their operation is derived from a coiled spring and is imparted through transmission mechanism to the fan having a plurality of units such as wheels, pinions, worms, pulleys, springs and the like. The invention has for its object to provide a simple and inexpensive instrument which will uniformly distribute the air in a constantly changing direction and run for a considerable length of time without necessitating any further attention after the initial winding of the spring. Furthermore, improved means are provided for arresting the rotation of the fan when required.

According to this invention, a spring-operated fan consists in the combination of a supporting member, a body carrying a train of wheels for driving and revolving mounted on the supporting member, a stationary toothed wheel co-axial with the supporting member, a driven-pinion axially slidable so as to engage with, and be disengaged from, the operating mechanism, and a toothed wheel axially movable in synchronism with the driven pinion so as to engage with, and be disengaged from, the stationary toothed wheel, whereby the fan will deliver breezes in a fixed direction, or the fan will be rotated about its supporting member to deliver breezes in a constantly changing direction.

In order that my invention may be properly understood and readily carried into effect, I have hereunto appended one sheet of drawings in which I have illustrated the invention by the forms best known to me, but which forms are to be regarded as typical of many possible forms, and my invention is not to be confined to those illustrated.

Figure 2:
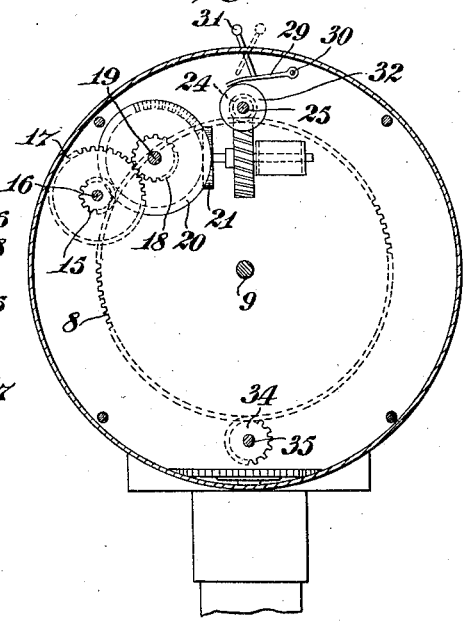
Fig. 2 is a section through the casing looking interiorly in the direction of the arrow in Fig. 1.

In a constructional embodiment of the invention, a body 1 is provided with an attached bearing member 2 having a tubular extension 3 encircling a vertical supporting member 4. Between the bearing member 2 and the upper end of the supporting member 4 are interposed ball bearings 5 whereby the body 1 together with its assembled members is adapted to freely rotate upon said supporting member. Vertically extending through the latter is a spindle 6, on the upper end of which is fixed a horizontal toothed wheel 7 with which a toothed bevel or contrate wheel 7ª is adapted to engage as hereafter described. A driving gear wheel 8 is mounted so as to freely revolve on a spindle 9 journalled in both end walls of the body 1 and a partition 10. An outer casing 11 may be arranged to enclose the body 1, the spindle 9 projecting through the said body and casing for being rotated by a key. A coiled band spring 12 is connected at its inner extremity to the spindle 9 and at its outer extremity to a bolt or other projection anchored to the rear head of the body 1 and the partition 10. Fixed upon the spindle 9 is a ratchet wheel 13 with which engages a pawl 14 carried by the driving gear wheel 8 so that the spindle 9 and ratchet wheel 13 may be rotated in a particular direction to constrain the spring 12 without movement being imparted to the gear wheel 8, whereas, the spring 12 in expanding, rotates the spindle 9 in a reverse direction which is conveyed through the medium of the ratchet wheel 13 and pawl 14 to the gear wheel 8. In mesh with the gear wheel 8 is a pinion 15 fixed upon the spindle 16, on the opposite end of which is fixed a wheel 17 meshing with a pinion 18 which is fixed upon a spindle 19. Upon the latter is mounted a contrate wheel 20 which meshes with a pinion 21 fixed to a spindle 22. This spindle carries a worm wheel 23 gearing with a worm 24 on the spindle 25 of which is mounted a fan 26 enclosed in a shield 27 of wire gauze or equivalent, the latter being preferably secured in position to a grooved member 28 fitted in front of the body 1.

A brake for arresting the motion of the fan 26 consists of a resilient blade 29 anchored at one end to a projection 30 on the inside of the body 1, over which blade 29 wipes an arm 31 fulcrumed upon a suitable centre on the inside of the body. As the arm 31 is moved into a position so that its effective length is increased, it forces the blade 29 into engagement with a brake wheel 32 on the fan spindle 25.

Figure 1:
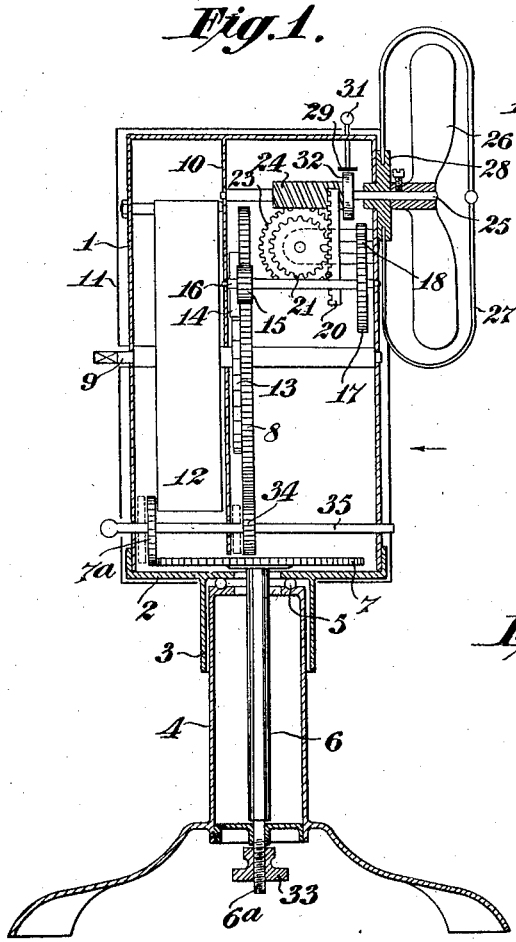
Fig. 1 is a section through the casing showing the interior mechanism in side view.

The vertical spindle 6 has a screwed lower end 6ª on which is a screw lock nut 33 adapted to be screwed home against the base of the supporting member 4 so as to lock the spindle 6 against rotation and render the toothed wheel 7 non-rotational, or stationary. When it is desired for the fan and its operating mechanism to be revoluble about its supporting member 4, a pinion 34 is brought to gear with the driving wheel 8 as shown in Fig. 1. Said pinion 34 and the wheel 7ª are mounted on a spindle 35 which is slidably carried in bearings in the casing 1 and partition 10. When the pinion 34 is in gear with the driving wheel 8, the wheel 7ª is then in engagement with the toothed wheel 7, whereupon the wheel 7ª will overrun the stationary toothed wheel 7 and so cause the operating mechanism, casing, and fan to rotate as one unit about the supporting member 4 and cause air currents to be thrown in a constantly changing direction about the axis of rotation. When the spindle 35 is drawn outwards so as to bring the pinion 34 and wheel 7ª into the dotted position, the body 1 and casing 11 will then remain stationary with the fan producing air currents at one side of the instrument.

Figure 3:
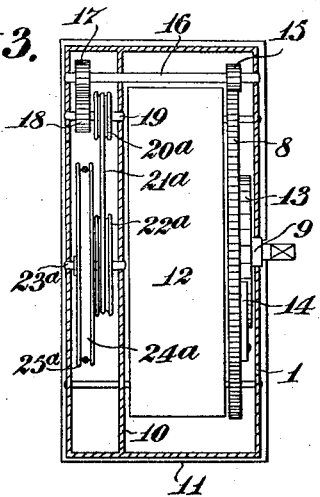
Fig. 3 is a part section through the casing with a slightly modified form of transmitting by bands.

In the modified form in Fig. 3, instead of a worm and worm wheel driving mechanism, transmission is by bands. In this construction, upon the spindle 19 is a pulley 20ª round which passes a band 21ª running to a pulley 22ª mounted on a spindle 23ª which is journalled in the partition 10 and in one of the heads of the body 1. Upon the spindle 23ª is mounted a larger pulley 24ª which may be formed integrally with or fixed to the pulley 22ª, and from the larger pulley 24ª, a band 25ª runs to a pulley (not shown) mounted on the fan spindle 25.

What I claim as my invention and desire to secure by Letters Patent is:—

In a fan the combination of a casing provided with a tubular extension rotatably mounted upon a vertical supporting member, a vertical shaft supported in bearings in said supporting member, said vertical shaft being threaded at the lower end, a lock nut engaging said threaded base for locking the vertical shaft against rotation, a horizontal toothed wheel secured to the upper end of said vertical shaft, a movable horizontal shaft provided with a pinion and contrate wheel, the latter engaging with said horizontal toothed wheel, a coiled spring motor driving a gear wheel meshing with the pinion on said movable horizontal shaft, said gear wheel also driving a pinion integral with a shaft carrying a gear wheel, a second shaft, a pinion keyed thereto meshing with said second mentioned gear wheel, a contrate wheel meshing with a pinion, the latter driving a worm gear, a worm shaft provided with a brake wheel, a resilient blade being anchored at one end, an arm engaging said blade fulcrumed to said casing, a fan keyed to said worm shaft being enclosed in a shield secured to said casing Dated the 9th day of April 1925.

JOHN CAIRNS.